(12) United States Patent (10) Patent No.: US 8,131,583 B1
Rapposelli-Manzo (45) Date of Patent: Mar. 6, 2012

(54) METHOD, APPARATUS, AND ARTICLE OF MANUFACTURE FOR GENERATING A SERVICE BLUEPRINT FOR MONITORING AND EVALUATING ORGANIZATIONAL PROCESSES

(75) Inventor: Chris Rapposelli-Manzo, Manasquan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1253 days.

(21) Appl. No.: 11/259,869

(22) Filed: Oct. 27, 2005

(51) Int. Cl.
G06Q 30/00 (2006.01)
(52) U.S. Cl. ............... 705/7.41; 705/7.38; 705/7.39
(58) Field of Classification Search ............ 705/7.38, 705/7.39, 7.41
See application file for complete search history.

(56) References Cited

U.S. PATENT DOCUMENTS

| | | | | |
|---|---|---|---|---|
| 5,134,574 | A * | 7/1992 | Beaverstock et al. | 702/84 |
| 7,139,731 | B1 * | 11/2006 | Alvin | 705/35 |
| 7,225,249 | B1 * | 5/2007 | Barry et al. | 709/227 |
| 7,233,908 | B1 * | 6/2007 | Nelson | 705/7.32 |
| 7,551,917 | B1 * | 6/2009 | Winner et al. | 455/414.1 |
| 2002/0026394 | A1 * | 2/2002 | Savage et al. | 705/34 |
| 2004/0073436 | A1 * | 4/2004 | Vaishnavi | 705/1 |
| 2004/0133487 | A1 * | 7/2004 | Hanagan et al. | 705/34 |
| 2005/0010523 | A1 * | 1/2005 | Myklebust et al. | 705/40 |
| 2006/0047566 | A1 * | 3/2006 | Fleming et al. | 705/11 |
| 2006/0112104 | A1 * | 5/2006 | An et al. | 707/10 |
| 2007/0033571 | A1 * | 2/2007 | Moore et al. | 717/104 |
| 2010/0082492 | A1 * | 4/2010 | Jarman et al. | 705/67 |

OTHER PUBLICATIONS

Karni, Modelling of Collaborative Business Processes, The 13th Israeli Industrial Engineering & Management Conference, IE&M 2004, Tel-Aviv, Israel, Mar. 16-17, 2004, pp. 1-19.*
Stender and Ritz, Modeling of B2B mobile commerce process, Int. J. Production Economics 101 (2006), p. 128-139 (available online Jul. 22, 2005).*
Schulz and Orlowska, Architectural Issues for Cross-Organizational B2B Interactions, IEEE 2001, pp. 79-87.*
Johnston, The determinants of service quality: satisfiers and dissatisfiers, International Journal of Service Industry Management, vol. 6, No. 5, 1995, pp. 53-71.*
Parasuraman et al., A Conceptual Model of Service Quality and Its Implications for Future Research, Journal of Marketing, vol. 49 (Fall 1985), pp. 41-50.*
Seang, Goh Swee, "Best Practices in KPI", National Conference of Key Performance Indicators 2003, Oct. 21-23, 2003, Pan Pacific Hotel, Kuala Lumpur.
Hertin, J., et al. "Indicators for Monitoring Integration of Environmental and Sustainable Devel. in Enterprise Policy", SPRU-Science and Tech. Policy Research, Univ. of Sussex, UK, Feb. 2, 2001.

* cited by examiner

Primary Examiner — Justin M Pats

(57) ABSTRACT

A method and tools are disclosed for systematically capturing the key elements of a business process in conjunction with the definition/development of focused key process indicators and threshold values that provide useful and manageable information about the health of the business process from both the managerial and operational perspective. A service blueprint is used to capture business processes in a novel and specialized manner. The service blueprint and associated Key Process Indicators (KPIs) are dynamic updated and linked within a business monitoring & control platform. The method of the present invention is flexible, dynamic, and allows for real-time measures that yield a picture of the present health of the process in addition to the capability of generating predictive vital signs as strong indicators of the future health of the business.

15 Claims, 5 Drawing Sheets

US 8,131,583 B1

METHOD, APPARATUS, AND ARTICLE OF MANUFACTURE FOR GENERATING A SERVICE BLUEPRINT FOR MONITORING AND EVALUATING ORGANIZATIONAL PROCESSES

BACKGROUND OF THE INVENTION

In a business environment, providing the best possible customer experience is highly desirable. Any failure to provide a high level of service, as measured by a departure from targeted performance at any link within the end-to-end business process, may have serious consequences in terms of lost business revenue and/or market share. Accordingly, such departures in performance need to be identified, measured, monitored and controlled proactively. At present, business processes and metrics, such as well-known Key Process Indicators (KPIs), are often defined in an ad hoc manner and are typically focused on operational issues rather than managerial issues and do not take into account how these issues relate directly and indirectly to customers and the business processes. This frequently results in a large volume of measurements and data that are confusing and that do not help to focus on refining what is most important to improve the business. This problem gets worse in an environment where the processes need to be changed often. In order to make such frequent changes successfully, details of the business sub-processes and their interrelations need to be carefully captured and key process indicators designed in order to identify anomalous behavior patterns. This ensures recognition and alerting of reduced process performance before it has significant negative impact on customers, revenue, and the overall cost of doing business. To date, the process of capturing the changes systematically and updating KPIs, remains predominantly un-addressed.

SUMMARY OF THE INVENTION

The present invention essentially solves the aforementioned problems. The present inventor has recognized that, by taking a systems-level approach, it is possible to identify potential reduced process performance before it has significant negative impact on customers, revenue, and the overall cost of doing business. More particularly, in accordance with a first embodiment in accordance with the principles of the present invention, the present inventor has invented a method and apparatus for systematically capturing the key elements of the business process in conjunction with the definition/development of focused KPIs and threshold values that provide useful and manageable information about the health of the business process from both the managerial and operational perspective. The method in accordance with the principles of the present invention may be used in an environment where the processes, metrics/KPIs and targets need to be updated frequently. A service blueprint is used to capture business processes in a novel and specialized manner. The service blueprint, KPIs and target values are dynamic updated and linked within a business monitoring & control platform. The method of this embodiment is flexible, dynamic, and allows for real-time measures that yield a picture of the present health of the process in addition to the capability of generating predictive vital signs as strong indicators of the future health of the business.

In accordance with one embodiment of the principles of the present invention, a computer implemented method is performed on a computer adapted to store a plurality of sets of data representative of a plurality of graphical representations. In particular, a computer memory stores a first set of data representative of a first graphical representation of a customer of a process; a second set of data representative of a second graphical representation of at least a first step of said process, said first step performed internal to a first organization; a third set of data representative of a third graphical representation of a second step of said process, said second step performed by a second organization; a fourth set of data representative of a fourth graphical representation separating said first graphical representation from said second graphical representation, said fourth graphical representation representative of a separation between said customer and said first organization; and a fifth set of data representative of a fifth graphical representation separating said second graphical representation from said third graphical representation, said fifth graphical representation representative of a separation between the first organization and said second organization. The plurality of graphical representations may, for example, represent a plurality of business processes and/or a plurality of functional organizations and boundaries separating those processes/organizations. Alternatively, the plurality of graphical representations may represent interactions between a customer and/or different business organizations.

DETAILED DESCRIPTION

Figure 1:
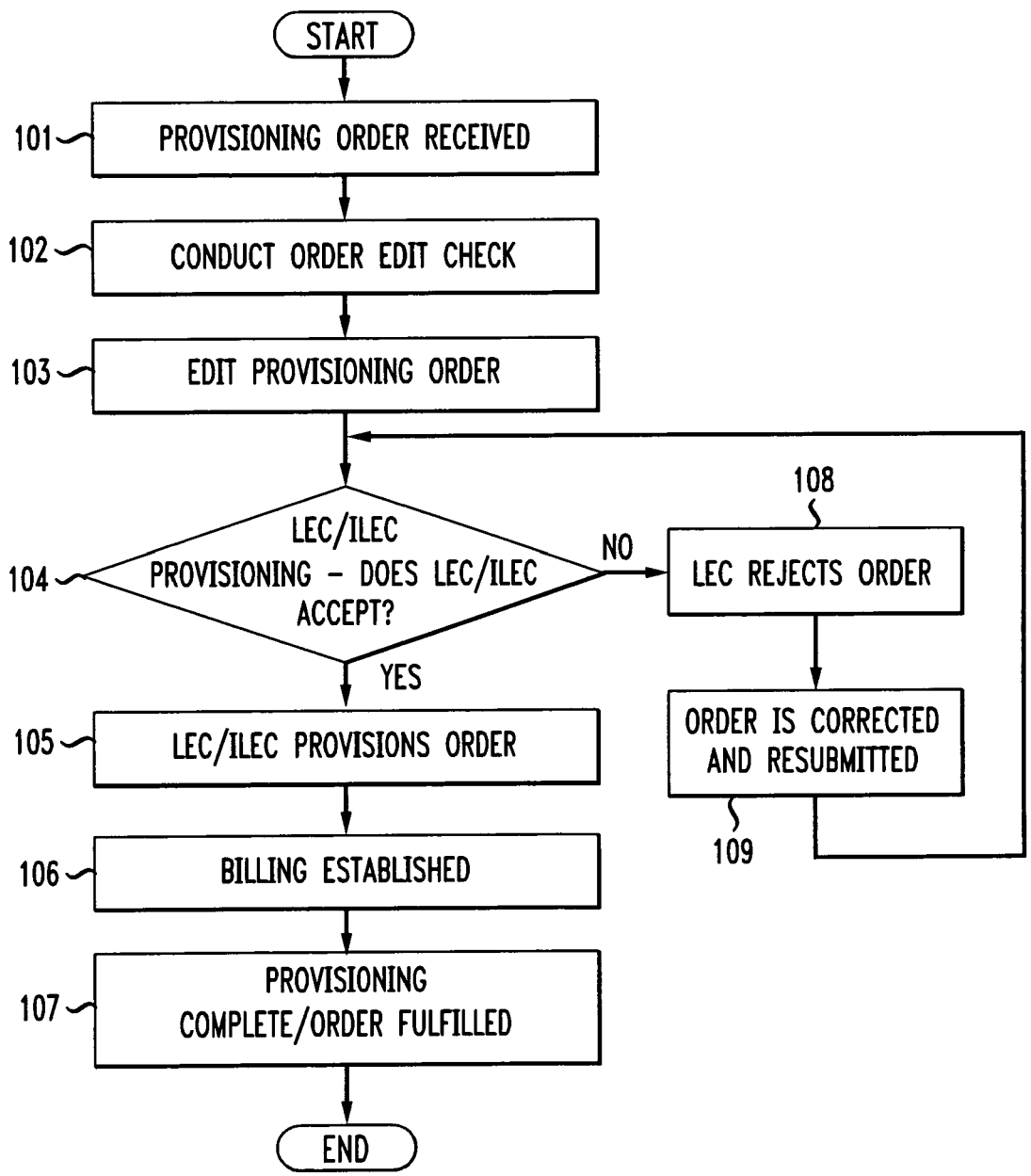
FIG. 1 shows an illustrative business process for the provisioning of telecommunication services.

FIG. 1 shows an illustrative business process used in the provisioning of telecommunication services. Specifically, FIG. 1 shows an illustrative high level telecommunication service provisioning process. At step 101, a provider order for provisioning is received. At step 102, an edit check of the order is accomplished. At step 103, the edited order is forwarded for provisioning. Then, at step 104, a determination is made whether the order is acceptable to the service provider. If the order is acceptable, then, at step 105, the service is provisioned and a provisioned order is created. Billing for the service is established at step 106 and the order for service is fulfilled at step 107. If, on the other hand, at step 104 the determination is made that the order is unacceptable and, at step 108, the order is rejected. Then, at step 109, the order is corrected and resubmitted. Then, at step 104, the determination is made again whether the order is acceptable.

It is often desirable to measure the quality of customer service provided during, for example, the provisioning process described in FIG. 1. Therefore, once the steps of a method, such as the method of FIG. 1, have been identified, in order to understand and evaluate the quality of service provided during the steps of the method, it is necessary to identify and measure metrics. The process of developing metrics is discussed further herein below. Once metrics have been identified, it is then necessary to gather data in order to generate values for each of the metrics. One skilled in the art will recognize that such data can be obtained from existing documentation associated with a given process, once again such as the process shown in FIG. 1. Sources of such information include: information posted on a web site; documentation prepared and presented for existing status meetings; existing target values; process documentation; existing data used for any metrics related documentation; and market research data on customer expectations and competitor performance especially related to metrics. One skilled in the art will recognize that many other sources of data may be used in support of generating metrics, such as interview/focus group data, questionnaires, and direct observation of the process as it is being performed.

Figure 2:
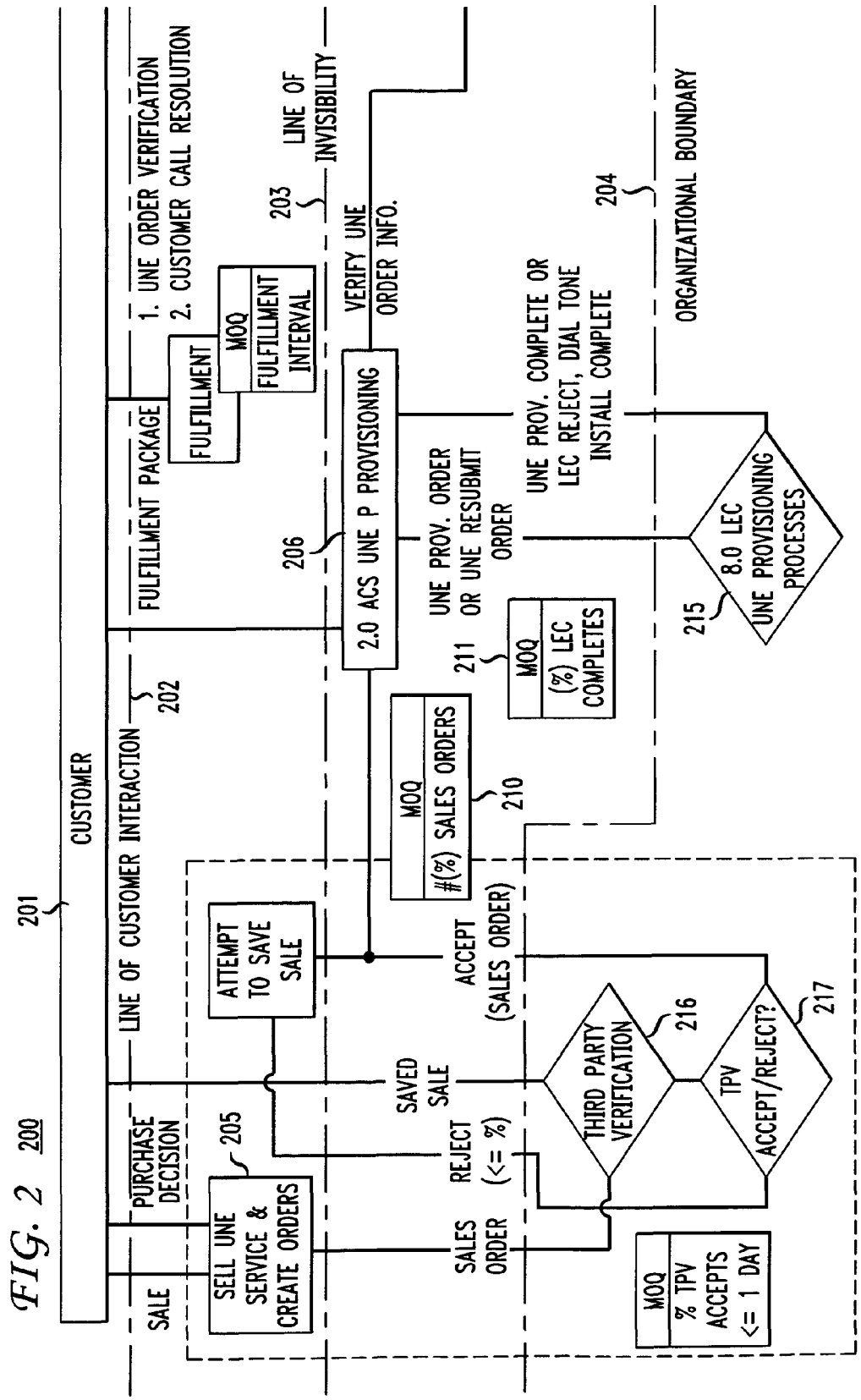
FIG. 2 shows a service blue print in accordance with the principles of the present invention.
Figure 2:
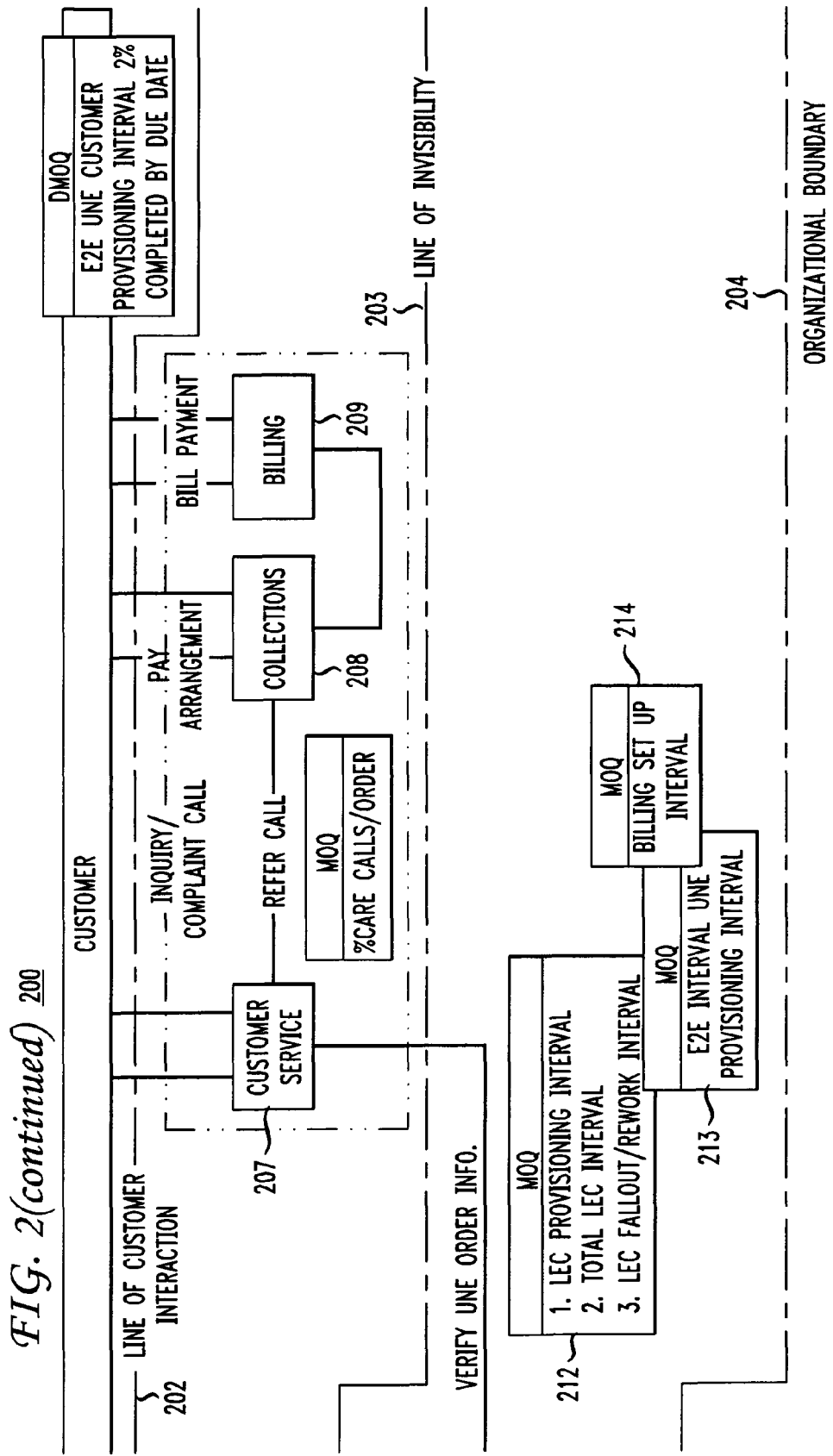

To obtain a better understanding of a particular method, as well as to assist in the development of metrics to evaluate customer service and the effectiveness of a process, a tool referred to herein as a service blueprint, also referred to herein interchangeably as a blueprint, may be used. The service blueprint is a specialized high level process diagram that depicts the overall process with an emphasis on the customer's experience. Such a blueprint is, illustratively, beneficial in assisting metrics development since it creates visibility into how the customer is connected to internal work activities and highlights interdependencies and linkages between processes showing how organizations contribute to the process of serving customers. It also can show potential problem points and areas that are key to meeting customer requirements. The service blueprint may illustratively be developed before the operational process flow and may illustratively be kept at a fairly high level so as not to greatly overlap the operational flow. FIG. 2 shows an illustrative service blueprint corresponding to the operational method of FIG. 1. The service blueprint is, illustratively, a top to bottom view of the process from the customer's viewpoint.

A service blueprint, such as the service blueprint of FIG. 2, is a specialized high-level process diagram that depicts the overall customer service process with an emphasis on a customer's interaction with an organization. Such a diagram is a novel tool to assist in the development of metrics for an organization as it creates visibility into the relationship between internal work activities and the customer. The service blueprint may be developed by first brainstorming or otherwise identifying all points of customer interaction (defined herein as any time a customer has the opportunity to form an opinion about a company) that fall within the scope of the business method. In addition to brainstorming, other sources of data may be used to assist in determining points of interaction with customers, including customer needs/requirements gathered from market research e.g. focus groups, complaint data and listening posts (employees with direct customer contact).

Referring to FIG. 2, service blueprint 200 has an illustrative graphical representation 201 representing a customer of an organization. Line 202, illustratively, is a line of customer interaction with the various entities and processes of an organization. For example, a customer represented by graphical representation 201 may interface with a sales department 205, a provisioning system 206, a customer service department 207, and collections and billing departments 208 and 209, respectively. Line 203 is an illustrative dividing line between those organizational processes and entities that are visible to customers and those that are transparent to the customer. For example, while a customer interacts with provisioning system 206, the customer will only perceive an interaction with, for example, sales department 205 or customer service department 207. Various metrics, represented by graphical representations 210-214 may also be computed, herein referred to as Measures of Quality (MOQs). These metrics are below line 203 in FIG. 2 and, therefore, are transparent to the customer.

Line 204 represents the dividing line of the organization directly or indirectly interacting with the customer. This line is necessary because, for example, in many cases a customer will interact with entities outside of an organization and, additionally, external entities may indirectly impact the customer. More particularly, a customer may interact with a third party, illustratively, providing a separate verification process, represented by blocks 216 and 217. Alternatively, the third party provisioning process represented by block 215 interacts with the customer transparent provisioning system 206. Although the third party providers are not directly controlled by the organization above line 204, customer service is defined in part by the quality of service provided by those third party providers. As a result, it is important to represent third party providers on the service blueprint. The end result is a diagram that identifies all interactions between a customer and the organizations that may directly or indirectly effect the quality of service perceived by the customer.

Figure 3:
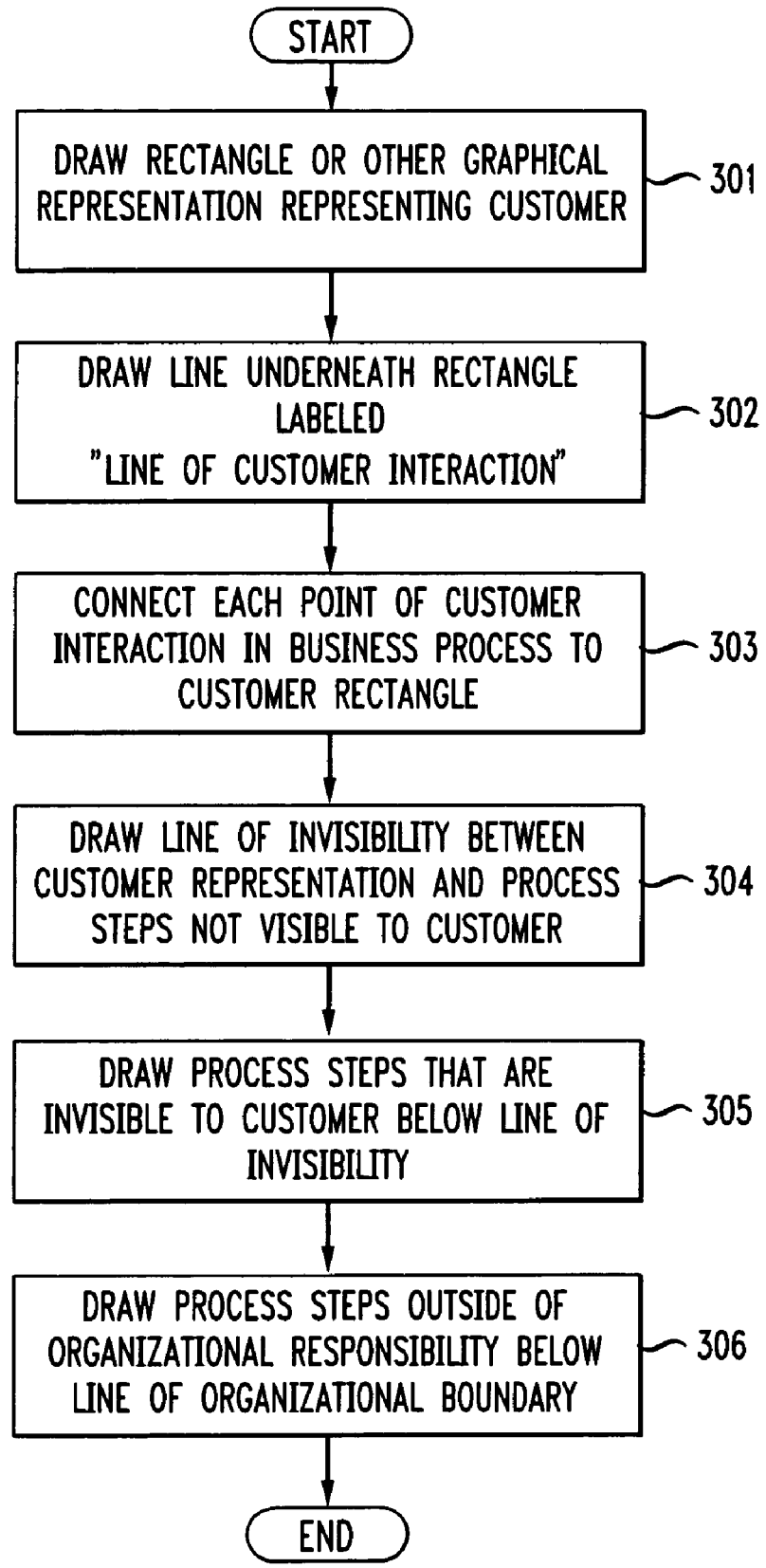
FIG. 3 shows an illustrative method in accordance with the principles of the present invention.

FIG. 3 shows the illustrative steps of a method whereby the service blueprint may be created. At step 301, a graphical representation, such as rectangle 201 in FIG. 2, is drawn that spans the long side of the page and is labeled "Customer." Next, at step 302, a dotted line is illustratively drawn beneath the rectangle and labeled "Line of Customer Interaction." Then for each point of customer interaction, at step 303, a line is drawn from the customer rectangle through the dotted line of interaction and labeled it with a name reflective of the tangible or intangible information passed during the interaction. The interfaces to the customer are processes of the company that the customer is aware of. At step 304, for anything beyond those processes, another line is drawn, such as line 203 in FIG. 2, referred to herein as the "line of invisibility." The customer illustratively does not see or care about the processes that fall below the line of invisibility, but because these processes support the customer, they are important to identify.

Everything below the line of customer interaction, 202 in FIG. 2, comprises internal business process that serves the customer. For each point of customer interaction, a process function is drawn and labeled with the work activity describing the interaction. At step 305, the steps of the process that support customer interaction activity are determined and are physically drawn below the "line of invisibility." At step 306, functions that are outside the scope of the current organization or outside the company are drawn below another line, represented by line 204 in FIG. 2, called the "organizational boundary". All functions are labeled with a logical name describing the process and are connected to the functions or processes they interface with an arrowhead line that defines the direction of data flow. The line is labeled with a logical name describing the type of data being passed between functions. The illustrative service blueprint of FIG. 2, developed via the method of FIG. 3, displays which points of customer interaction exist between the various steps of any method as well as whether those steps are visible or invisible to the customer. These points of interaction may be used to develop metrics, such as well-known Key Performance Indicators (KPIs), which can also be displayed on the service blueprint.

As discussed previously, KPIs are metrics that measure processes or sub-processes that provide critical information about the health of a business process. In general, there are two types of KPIs, Direct Measures of Quality (DMOQs) and Measures of Quality (MOQs). DMOQs measure the points of interaction (also referred to herein as touch points) with a customer and are used any time the customer has an opportunity to form an opinion about a particular organization. MOQs, on the other hand, measure the underlying processes that support the activities of interaction, but are not visible to the customer. Examples of a DMOQ include time interval to receive a service/product, satisfaction with the service/product, satisfaction with their interaction with a sales or customer care person, accuracy of their bill, etc. Examples of a MOQ include the interval to get the local exchange carrier (LEC) to provision the customer order, the percent of orders rejected by the LEC, the time interval to set up billing, etc. One skilled in the art will recognize that each DMOQ and MOQ is desirably characterized by a succinct metric form and an operational definition that removes any ambiguity from what was meant by the metric. One skilled in the art will recognize that the task of developing such metrics accurately is critical to eliminate any aspect that allows someone to insert their own interpretation to the metric's meaning. One skilled in the art will also realize that each metric illustratively is associated with a specific mathematical formula that helps to define it. Like operational definitions, the formula also aids in removing ambiguity and interpretation issues. In most cases, formulas will be created to form tangible results, such as results measured in percentages or other quantifiable measurements. Threshold may then be applied to the metrics. Thresholds are the values also known as target values given to the metrics. The value will either create a situation where it is either desirable to achieve or exceed, so the direction of the metric is up or increasing or it is desirable to fall below in which case the direction of the metric is down or decreasing. One skilled in the art will recognize that such a threshold depends on the metric, however such a threshold may be related to, for example, a desirable level of service that is, for example, established by an industry standard as part of the metric target definition. Once a set of KPIs (DMOQs and MOQs) is defined, they are then mapped to the appropriate block on the process flow.

The service blueprint described herein above is, accordingly, useful from a high level managerial perspective. However, one skilled in the art will recognize that such a service blueprint also possesses the ability to expand a function of the Blueprint to a lower level sub-blueprint or operational process flow with the appropriate level of detail to manage a lower level part of the business. This type of layering can provide all layers of management with appropriate views and metrics for managing the business from both managerial and operational perspectives.

Figure 4:
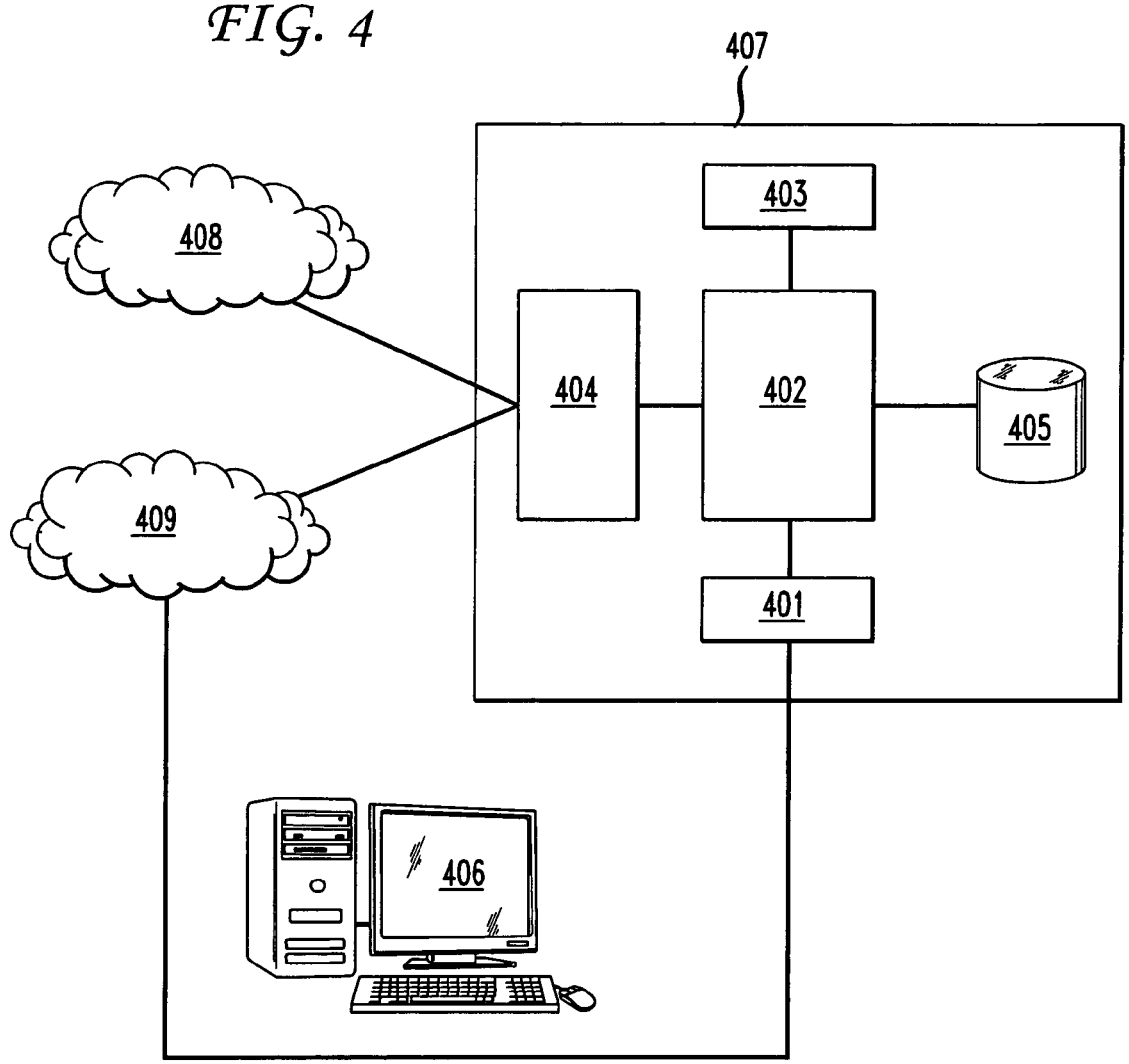
FIG. 4 shows a computer adapted to perform the steps of the method of FIG. 3.

While the above description primarily concerns creating a physical process blueprint and associated metrics, one skilled in the art that such a blueprint and metrics will primarily be created via a graphical computer adapted to perform the steps of the processes described herein. Referring to FIG. 4, graphical computer 407 may be implemented on any suitable computer adapted to receive store and transmit data. Referring to FIG. 4, illustrative computer 407 may have, for example, a processor 402 (or multiple processors) which controls the overall operation of the graphical computer 407. Such operation is defined by computer program instructions stored in a memory 403 and executed by processor 402. The memory 403 may be any type of computer readable medium, including without limitation electronic, magnetic, or optical media. Further, while one memory unit 403 is shown in FIG. 4, it is to be understood that memory unit 403 could comprise multiple memory units, with such memory units comprising any type of memory. Graphical computer 407 also comprises illustrative modem 401 and network interface 404. Modem 401 is used to connect, for example, to network 409 in FIG. 4, and network interface 404 is used to connect to network 408. Graphical computer 407 also illustratively comprises a storage medium, such as a computer hard disk drive 405 for storing, for example, data and computer programs adapted for use in accordance with the principles of the present invention as described hereinabove. Finally, graphical computer 407 also illustratively comprises one or more input/output devices, represented in FIG. 4 as terminal 406, for allowing interaction with, for example, a service provider technician or database administrator. One skilled in the art will recognize that graphical computer 407 is merely illustrative in nature and that various hardware and software components may be adapted for equally advantageous use in a computer in accordance with the principles of the present invention.

As described herein above, the service/process blueprint and associated metrics take a systems approach to address some major monitoring and control issues faced by today's management. As discussed above, these tools capture a business process systematically using a specialized format that truly depicts the detailed input, output, functions, operations, information flow and the decisions within the process including interactions with customers, suppliers and the supporting resources. The service blueprint reveals if the activities could be performed sequentially or concurrently, showing the functional relationship between the customers, suppliers, process owners, and other organizations and systems either internal or external. The service blueprint then facilitates using customer requirements and business preferences data to prioritize key elements of greatest importance to the customer as well as the business, and links those key areas to the business process forming two tiers from which a manageable set of key process indicators (KPIs) are derived. In addition, these indicators are illustratively developed with specific criteria to ensure that they are measurable in a timely manner and are proactive to ensure that a problem is recognized and corrected before significant negative impact on the business occurs. Alert thresholds for the KPIs are determined based on current or past levels of performance, customer expectations of performance, and/or competitor performance. The business process, KPIs and their associated alert thresholds are then mapped and programmed into an appropriate control system, such as the graphical computer described above, for monitoring.

The invention claimed is:

1. A computer implemented method performed on a computer configured to map key performance indicators and threshold values to a service blueprint for one of a plurality of processes performed by a service provider, the method comprising:

generating at a computer processor a first set of data representative of a first graphical representation of a customer of a process;

generating at the computer processor a second set of data representative of a second graphical representation of at least a first step of the process, the first step performed internal to a first organization;

generating at the computer processor a third set of data representative of a third graphical representation of a second step of the process, the second step performed by a second organization;

generating at the computer processor a fourth set of data representative of a fourth graphical representation separating the first graphical representation from the second graphical representation with a first line of invisibility, the fourth graphical representation representative of a separation between the customer and the first organization;

generating at the computer processor a fifth set of data representative of a fifth graphical representation separating the second graphical representation from the third graphical representation with a second line of invisibility, the fifth graphical representation representative of a separation between the first organization and the second organization;
generating at the computer processor a sixth set of data representative of at least one interaction between the first organization and the second organization;
generating a service blueprint on the computer processor by combining at least the first, second, third, fourth, fifth, and sixth sets of data;
defining on the computer processor key performance indicators associated with the service blueprint, the key performance indicators including direct measures of quality and measures of quality, wherein the direct measures of quality include a time interval to receive a service and an accuracy of a bill, and the measures of quality include an interval for a local exchange carrier to provision a customer order and a percentage of orders rejected by the local exchange carrier;
applying threshold values to the key performance metrics;
mapping the key performance indicators and the threshold values to the service blueprint;
dynamically updating the service blueprint, the key performance indicators, and the threshold values; and
displaying, on the computer, the dynamically updated (1) service blueprint, (2) key performance indicators, and (3) threshold values on a single display for the purpose of monitoring the process in order to identify departures of the dynamically updated key performance indicators from the dynamically updated threshold values so as to avoid negative impact on customers, revenue, and an overall cost of doing business.

2. The method of claim 1 wherein the plurality of graphical representations represent a plurality of functional organizations and the separation between the plurality of functional organizations.

3. The method of claim 1 wherein the plurality of processes comprise a plurality of processes performed by a telecommunication service provider.

4. The method of claim 3 wherein the plurality of processes comprise a sales process, a provisioning process, a customer service process or a billing process performed by the telecommunication service provider.

5. The method of claim 1 further comprising:
generating a seventh set of data representative of an interaction between the customer and the first organization.

6. The method of claim 1 wherein the direct measures of quality measure points of interaction with a customer and the measures of quality measure underlying processes that support the interaction with the customer.

7. An apparatus comprising a computer configured to map key performance indicators and threshold values to a service blueprint for one of a plurality of processes performed by a service provider, the computer configured to perform:
generating a first representation of a customer of a process;
generating a second graphical representation of a first step of the process, the step performed internal to a first organization;
generating a third graphical representation of a second step of the process, the step second performed internal to a second organization;
generating a fourth graphical representation separating the first graphical representation from the second graphical representation with a first line of invisibility, the fourth graphical representation representative of the separation between the customer and the first organization;
generating a fifth graphical representation separating the second graphical representation from the third graphical representation with a second line of invisibility, the fifth graphical representation representative of the separation between the first organization and the second organization; and
generating a sixth graphical representation of an interaction between the first organization and the second organization;
generating a service blueprint by combining at least the first, second, third, fourth, fifth, and sixth sets of data;
defining key performance indicators associated with the service blueprint, the key performance indicators including direct measures of quality and measures of quality, wherein the direct measures of quality include a time interval to receive a service and an accuracy of a bill, and the measures of quality include an interval for a local exchange carrier to provision a customer order and a percentage of orders rejected by the local exchange carrier
applying threshold values to the key performance metrics;
mapping the key performance indicators and the threshold values to the service blueprint;
dynamically updating the service blueprint, the key performance indicators, and the threshold values; and
displaying the dynamically updated (1) service blueprint, (2) key performance indicators, and (3) threshold values on a single display for the purpose of monitoring the process in order to identify departures of the dynamically updated key performance indicators from the dynamically updated threshold values so as to avoid negative impact on customers, revenue, and an overall cost of doing business.

8. The apparatus of claim 7 wherein the plurality of graphical representations represent a plurality of functional organizations and the separations between the plurality of functional organizations.

9. The apparatus of claim 7 wherein the plurality of processes comprise a plurality of processes performed by a telecommunication service provider.

10. The apparatus of claim 9 wherein the plurality of processes comprise a sales process, a provisioning process, a customer service process and a billing process performed by a telecommunication service provider.

11. The apparatus of claim 7 wherein the computer is further configured to perform:
displaying a seventh graphical representation of an interaction between the customer and the first organization.

12. The apparatus of claim 7 wherein the direct measures of quality measure points of interaction with a customer and the measures of quality measure underlying processes that support the interaction with the customer.

13. An article of manufacture including a tangible computer readable medium having instructions stored thereon, that in response to execution by a computing device cause the computing device to perform operations to map key performance indicators and threshold values to a service blueprint for one of a plurality of processes performed by a service provider, the operations comprising:
generating a first set of data representative of a first graphical representation of a customer of a process;
generating a second set of data representative of a second graphical representation of a first step of the process, the first step performed internal to a first organization;
generating a third set of data representative of a third graphical representation of a second step of the process, the second step performed by a second organization;
generating a fourth set of data representative of a fourth graphical representation separating the first graphical representation from the second graphical representation with a first line of invisibility, the fourth graphical representation representative of a separation between the customer and the first organization;

generating a fifth set of data representative of a fifth graphical representation separating the second graphical representation from the third graphical representation with a second line of invisibility, the fifth graphical representation representative of a separation between the first organization and the second organization;

generating a sixth set of data representative of an interaction between the first organization and the second organization;

generating a service blueprint by combining at least the first, second, third, fourth, fifth, and sixth sets of data;

defining key performance indicators associated with the service blueprint, the key performance indicators including direct measures of quality and measures of quality, wherein the direct measures of quality include a time interval to receive a service and an accuracy of a bill, and the measures of quality include an interval for a local exchange carrier to provision a customer order and a percentage of orders rejected by the local exchange carrier;

applying threshold values to the key performance metrics;

mapping the key performance indicators and the threshold values to the service blueprint;

dynamically updating the service blueprint, the key performance indicators, and the threshold values; and displaying the dynamically updated (1) service blueprint, (2) key performance indicators, and (3) threshold values on a single display for the purpose of monitoring the process in order to identify departures of the dynamically updated key performance indicators from the dynamically updated threshold values so as to avoid negative impact on customers, revenue, and an overall cost of doing business.

14. The article of manufacture of claim 13, wherein the operations further comprise:

generating a seventh set of data representative of interaction between the customer and the first organization.

15. The article of manufacture of claim 13 wherein the direct measures of quality measure points of interaction with a customer and the measures of quality measure underlying processes that support the interaction with the customer.

* * * * *